May 28, 1963

J. O. MOORHEAD 3,091,121

THERMOSTATIC CONTROLS

Filed Oct. 27, 1958

John O. Moorhead,
Inventor,
Koenig and Pope,
Attorneys.

United States Patent Office 3,091,121
Patented May 28, 1963

3,091,121
THERMOSTATIC CONTROLS
John O. Moorhead, Attleboro, Mass., assignor to Texas Instruments Incorporated, Dallas, Tex., a corporation of Delaware
Filed Oct. 27, 1958, Ser. No. 769,627
22 Claims. (Cl. 73—378.3)

This invention relates to thermostatic controls, such as thermostatic switches, thermostatic valves and the like, and more particularly to thermostatic controls of the type including a snap-acting temperature-responsive device, such as a dished snap-acting thermostatic disc as shown in my Patent 2,824,194, dated February 18, 1958, for Switch Structures.

Certain snap-acting temperature-responsive devices, such as the well-known dished snap-acting automatic reset thermostatic discs, have a characteristic referred to as "temperature differential," meaning the differential between the temperature at which they snap in response to temperature change in one sequence or direction and the temperature at which they snap back in response to temperature change in the opposite sequence or direction. For example, a certain disc may snap from its unrestrained, free-state condition on being heated to 200° F., but will not snap back until it has cooled to 150° F. In such case the temperature differential is said to be 50° F.

Among the several objects of this invention may be noted the provision of a thermostatic control including a snap-acting thermostatic device of the character described which has means for reducing the temperature differential of the control as a whole in respect to the free-state temperature differential of the snap-acting thermostatic device per se, so that the control has a relatively narrow temperature differential; and the provision of a control such as described which is of simple construction and which is economical to manufacture.

In general, the objects of the invention are attained by providing a system comprising a movable member (such as a contact member in the case of a switch) adapted for movement from and reverse movement back to an initial position and a spring member for returning the system to initial position with this spring member being of special character (such as a snap-acting spring disc) having a reactive return force which decreases with deflection away from initial position and increases with return movement, the system being actuated by a snap-acting temperature-responsive device (such as a dished snap-acting thermostatic disc) adapted on snap action thereof to move the system (including the spring member) from the initial position. With this arrangement, the spring member imposes a bias on the temperature-responsive device tending to return it to initial position, and this bias (which bias increases upon deflection in return direction as distinguished from the usual decreasing-bias type of return action) substantially reduces the temperature differential of the control as a whole in relation to the free-state temperature differential of the temperature-responsive device per se. Other objects and features will be in part apparent and in part pointed out herein after.

The invention accordingly comprises the constructions hereinafter described, the scope of the invention being indicated in the following claims.

In the acompanying drawings, in which one of various possible embodiments of the invention is illustrated, FIG. 1 is a vertical cross section taken on line 1—1 of FIG. 2 of a thermostatic switch embodying the invention, shown in circuit-closed position;

Corresponding reference characters indicate corresponding parts throughout the several views of the drawings.

Figure 1:
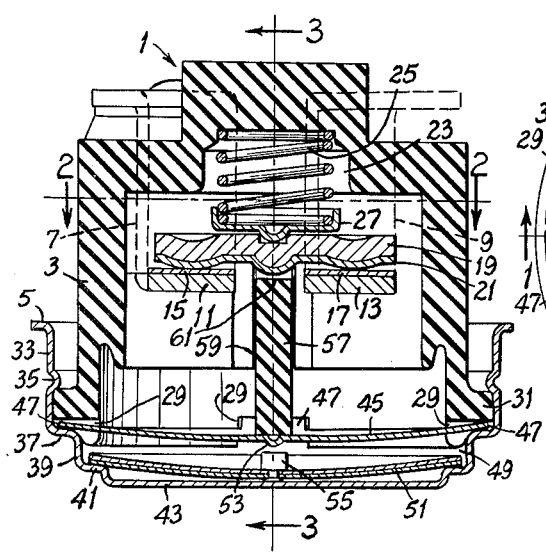
Figure 2:
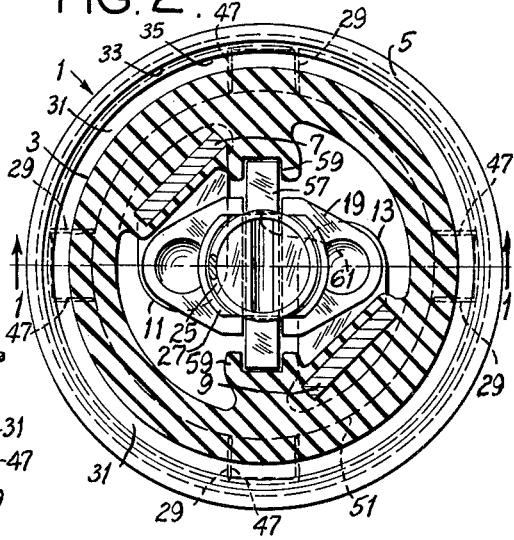
FIG. 2 is a horizontal cross section taken on line 2—2 of FIG. 1.

Referring to the drawings, the invention is shown as applied to a thermostatic switch generally designated 1. The switch comprises a support constituted by a case 3 having an inverted cup shape and composed of electrical insulation material. At numeral 5 is shown a cup-shaped sheet metal bottom closure for the open lower end of the case. The case may be molded of plastic material and provides a pair of apertures within which two switch terminals 7 and 9 made of brass or the like are fixedly disposed. These extend down into the case where they are formed with horizontally extending contact fingers 11 and 13. These fingers may be provided on their upper surface with layers 15 and 17 of silver or the like to provide contact surfaces of high electrical conductivity. The contact fingers 11 and 13 are spaced from one another on opposite sides of the case. They are adapted to be bridged by an electrically conductive bridge member 19 which may be made of brass or the like. Member 19 may be provided with a layer 21 of silver or the like on its bottom to provide a contact surface of high electrical conductivity. The top of the case is formed to provide a central downwardly directed recess 23. A compression coil spring 25 has its upper end seated in this recess and its other end seated in a cup-shaped spring seat 27 which bears down on the bridge member 19 to bias the bridge member downward toward engagement with contact fingers 11 and 13.

The case 3 is formed with notches 29 and with an outwardly projecting external rim 31 adjacent its lower end. The annular wall 33 of the cup-shaped sheet metal bottom closure 5 is telescoped over the rim and formed with a bead 35 overlying the rim to hold the bottom in assembly with the case. The bottom 5 is formed with an annular flat shelf portion 37 extending inward from the lower edge of the annular wall 33, a cylindrical portion 39 extending down from the inner periphery of shelf portion 37, and another annular flat shelf portion 41 extending inward from the lower edge of cylindrical portion 39. It also has a depressed bottom wall 43.

Figure 3:
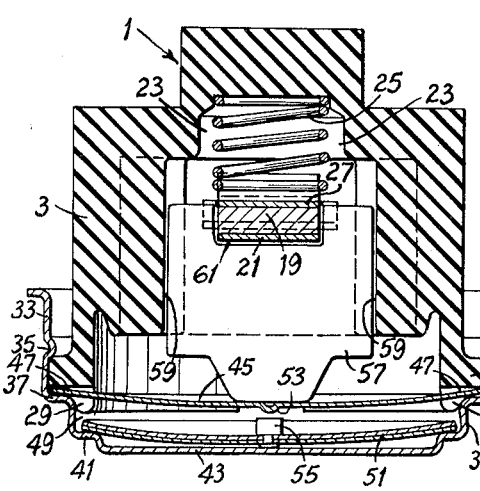
FIG. 3 is a vertical cross section taken on line 3—3 of FIG. 1.
Figure 4:
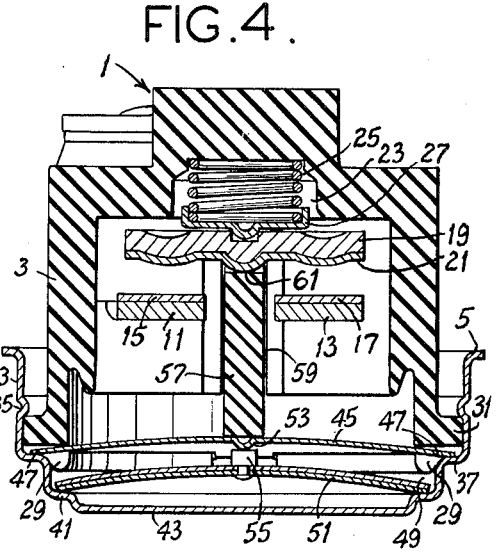
FIG. 4 is a view similar to FIG. 1 showing a moved position of parts wherein the circuit is open.

A dished snap-acting monometallic spring disc 45 has ears 47 received in the notches 29 and retained for free movement therein by the annular flat shelf portion 37 of bottom 5 underlying the ears. This spring disc normally occupies the outwardly (downwardly) arched position in which it is shown in FIGS. 1 and 3, this position being referred to as its first or initial position. It is adapted to snap to the inwardly (upwardly) arched second position in which it is shown in FIG. 4 upon application of force to its center in upward direction, and tends to snap back to its first position upon release of the force. In this sense it may be referred to as an automatic reset device. Unlike the spring 25, the spring disc 45 has a force-deflection curve which is not a straight line, which is to say that the sequence of forces required for increased deflections do not increase proportionally to deflection. A disc of this nature is sometimes called a Belleville spring. Ears 47 fit loosely in the notches 29 to allow the disc to snap.

The lower end of the case 3, the cylindrical portion 39 of the bottom 5 and the annular portion 41 of the bottom 5 define an annular recess 49 for loosely receiving the rim of a dished snap-acting bimetallic thermostatic disc 51 of the type shown in Spencer Patent 1,448,240, and which constitutes the temperature-responsive device of the switch 1. The thermostatic disc 51 lies under the spring disc 45 and is coaxial therewith. The thermostatic disc is a so-called automatic reset disc. It normally occupies the outwardly (downwardly) arched position in which it is shown in FIGS. 1 and 3, this position being referred to as its first or initial position. It is adapted to snap to the inwardly (upwardly) arched second position in which it is shown in FIG. 4 upon rise in temperature to a predetermined limit, and to snap back to its first position upon cooling. The fit of the rim of the disc 51 in recess 49 is sufficiently loose to allow the disc to snap.

The spring disc 45 is formed with a downwardly extending central boss 53 and the thermostatic disc 51 is provided with an upwardly extending central stud or spacer 55 engageable as an impact hammer with the boss 53 when the spring disc is in its first position and the thermostatic disc snaps up from its first position. The height of the stud or spacer 55 is less than the vertical spacing of the center of the thermostatic disc 51 and the boss 53 when the two discs are both in their first position. Supported on and extending up from the spring disc is a slide 57 made of electrical insulation material. This slide is guided for vertical sliding movement by having its side edges received in grooves 59 formed in the case 3 and extends upward between the contact fingers 11 and 13, having notch 61 in its upper end (see FIG. 3) receiving the bridge member 19.

Operation is as follows:

When the thermostatic disc 51 is below the temperature at which it is adapted to snap from its normal first position, the parts occupy the position in which they are shown in FIGS. 1 and 3, both the thermostatic disc 51 and the spring disc 45 being downwardly arched. The slide 57 then occupies a lowered position so that the coil compression spring 25 is effective to hold the bridge member 19 in closed position engaging the contact fingers 11 and 13. The upper end of the stud or spacer 55 is somewhat below the center of the spring disc 45 (below the bottom of the boss 53 on the spring disc).

When the temperature of the thermostatic disc rises, potential energy builds up therein, due to temperature induced stresses. At a predetermined value, the thermostatic disc (constituting means for actuating the spring disc 45) snaps upward from its first position (shown in FIGS. 1 and 3) to its second position (shown in FIG. 4). This rapidly converts the potential energy to kinetic energy. As it snaps upward with this kinetic energy, the upper end of the stud or spacer 55 after an interval of lost motion engages the central boss 53 on the spring disc 45. The impact on the spring disc snaps it upward from its initial position (shown in FIGS. 1 and 3) to the second position (shown in FIG. 4). As the spring disc snaps upward, it drives the slide 57 upward to lift the bridge member 19 (which constitutes a control element actuated by the spring disc) away from the contact fingers 11 and 13 against the downward bias of the coil compression spring 25.

The thermostatic disc 51 is then subjected to the downward bias of the compression coil spring 25 and to the downward bias of the spring disc 45 (which tends to return to its first position). The reactive force of the spring disc 45 is less however than it was at the beginning of deflection. The moved parts will not return to their initial positions at the elevated temperature. The thermostatic disc 51 by reason of a new set of forces therein resists the downward return bias and remains in its raised second position of FIG. 4 until it has cooled down to a temperature at which these internal forces therein are insufficient to hold it arched upward to resist the downward return bias. Thereupon, the thermostatic disc 51 snaps down back to its first position, allowing the spring disc 45 to snap back to its first position, and the bridge member 19 is returned into engagement with the contact fingers 11 and 13. The temperature at which the thermostatic disc snaps back down under the return bias of the spring disc 45 and the compression coil spring 25 is considerably higher than its free-state return-snap temperature. Accordingly, the temperature differential of the switch 1 is considerably less than the free-state temperature differential of the thermostatic disc 51 per se. By properly matching the thermal characteristics of the thermostatic disc and the mechanical characteristics of the spring disc, a strong, noncritical narrow temperature differential thermal switch can be produced, having a much narrower temperature differential than the free-state temperature differential of the thermostatic disc per se. For example, with the construction shown, using a thermostatic disc adapted in its free state to snap from first to second position at 200° F. and to snap back at 150° F. (a temperature differential of 50° F.), it is readily possible to make the snap-back temperature 185° F. (a temperature differential of only 15° F.).

While the compression coil spring 25 has some effect in making the temperature differential of the switch as a whole less than the free-state temperature differential of the thermostatic disc 51, its effect alone is minimized by reason of the fact that it is simply a weak return spring. Also, the thermostatic disc creeps before snapping. Considering the thermostatic disc in its raised position of FIG. 4 with the coil spring 25 under maximum compression, as the thermostatic disc cools, it creeps back downward before it snaps. This creep reduces the return force applied by the compression coil spring 25. For example, using the compression coil spring alone, without the spring disc, the snap-back temperature is 158° F. (a temperature differential of 42° F.). On the other hand, the characteristic of the spring disc 45 is such that the creep of the thermostatic disc prior to snapping is accompanied by increasing disc spring force which accelerates the return action of the spring disc as temperature lowers.

While the invention is above illustrated as it pertains to a switch, it will be understood that it is not limited in application to switches. It may be applied to other types of controls, such as valves. It will be understood that in its application to a valve, the slide 57 would control an element such as a movable valve member.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a thermostatic control, a system comprising a movable member adapted for movement from and reverse movement to an initial position and spring return means arranged to deflect in accordance with movement from the initial position and to bias the system to return to said initial position, a snap-acting thermostatic member, and connecting means between said thermostatic member and said system arranged in response to temperature change and snap action to move the system from the initial position against the return bias of said spring return means, said spring return means then exerting a return bias on said snap-acting thermostatic member, said spring return means of the system comprising a spring member having a reactive return force which decreases with deflection away from said initial position and increases with return movement toward said initial position.

2. In a thermostatic control, a system comprising a movable member adapted for movement from and reverse movement to an initial position and spring return means arranged to deflect in accordance with movement from the initial position and to bias the system to return to said initial position, a snap-acting thermostatic member, and lost-motion connecting means between said thermostatic member and said system, said snap-acting thermostatic member acting via said connecting means in response to temperature change and snap action after an interval of lost motion to move the system from the initial position against the return bias of said spring return means, said spring return means then exerting a return bias on said snap-acting thermostatic member, said spring return means of the system comprising a spring member having a reactive return force which decreases with movement away from said initial position and increases with return movement toward said initial position.

3. A thermostatic control according to claim 2, wherein said spring member is constituted by Belleville spring.

4. A thermostatic control according to claim 2, wherein said spring member is constituted by a monometallic automatic reset, snap-acting disc.

5. A thermostatic control according to claim 2, wherein said spring return means is constituted by a coil spring having proportional force-deflection characteristics and an automatic reset, monometallic snap-acting disc having reactive forces which decreases with deflection from said initial position and increase with return movements toward said position.

6. In a thermostatic control, a snap-acting spring means adapted to snap from a first to a second position upon application of force thereto in one direction and to snap back to its first position upon release of the force, a control element actuated by said spring means, and means for actuating said spring means comprising a snap-acting temperature-responsive device adapted to snap from a first to a second position upon temperature change in one direction and to snap back to its first position upon temperature change in the other direction, said temperature-responsive device, in snapping from first to second position being adapted to apply force in said one direction to the spring means to snap the latter from its first to its second position, and said spring means then imposing a bias on said temperature-responsive device tending to return it to its first position.

7. In a thermostatic control as set forth in claim 6, said temperature-responsive device being spaced from said spring means when said device and spring means are in their first position whereby said device has lost motion with respect to said spring means as said device snaps from first to second position.

8. In a thermostatic control as set forth in claim 6, said temperature-responsive device comprising a dished snap-acting thermostatic disc.

9. In a thermostatic control as set forth in claim 6, said temperature-responsive device comprising a peripherally supported dished snap-acting thermostatic disc centerwise engageable with said spring means.

10. In a thermostatic control as set forth in claim 9, the center of said disc being spaced from said spring means when said disc and spring means are in their first position whereby said disc has lost motion with respect to said spring means as said disc snaps from first to second position.

11. In a thermostatic control as set forth in claim 6, said spring means comprising a dished snap-acting spring disc.

12. In a thermostatic control as set forth in claim 6, said spring means comprising a peripherally supported dished snap-acting spring disc, the center of said spring disc being engageable by said temperature-responsive device.

13. In a thermostatic control as set forth in claim 12, said temperature-responsive device being spaced from the center of said spring disc when said device and spring disc are in their first position whereby said device has lost motion with respect to said spring disc as said device snaps from first to second position.

14. In a thermostatic control as set forth in claim 12, said temperature-responsive device comprising a peripherally supported dished snap-acting thermostatic disc coaxial with and centerwise engageable with said spring disc.

15. In a thermostatic control as set forth in claim 14, said thermostatic disc being spaced from the center of said spring disc when said thermostatic disc and spring disc are in their first position whereby said thermostatic disc has lost motion with respect to said spring disc as said thermostatic disc snaps from first to second position.

16. A thermostatic switch comprising a support, fixed contact means on said support, contact means movable toward and away from the fixed contact means, means for moving said movable contact means comprising snap-acting spring means carried by said support adapted to snap from a first to a second position upon application of force thereto in one direction and to snap back to its first position upon release of the force, and means for actuating said spring means comprising a snap-acting temperature-responsive device adapted to snap from a first to a second position upon temperature change in one direction and to snap back to its first position upon temperature change in the other direction, said temperature-responsive device, in snapping from first to second position, applying force to the spring means to snap the latter from its first to its second position, and said spring means then imposing a bias on said temperature-responsive device tending to return it to its first position.

17. A thermostatic switch as set forth in claim 16 wherein said spring means is a dished snap-acting one-way spring disc and said temperature-responsive device is an automatic reset dished snap-acting thermostatic disc.

18. A thermostatic switch as set forth in claim 17 wherein said discs are mounted on the support in coaxial relation closely adjacent one another, and wherein the thermostatic disc has means at its center for engagement with the center of the spring disc, said means being spaced from the spring disc when both discs are in the first position.

19. A thermostatic switch comprising a cup-shaped case, a closure for the open end of the case, a dished snap-acting spring disc peripherally supported at the open end of the case by the closure, a dished snap-acting thermostatic disc peripherally supported by the closure outward of and coaxial with the spring disc, each of said discs normally occupying an outwardly arched first position, said spring disc being adapted to snap to an inwardly arched second position upon application of force thereto in inward direction and tending to snap back to its first position upon release of the force, said thermostatic disc being adapted to snap to an inwardly arched second position upon temperature change in one direction and to snap back to its first position upon temperature change in the other direction, contact means fixed in the case, contact means movable in the case toward and away from the fixed contact means, and means in the case engageable by the spring disc and engageable with said movable contact means for moving the latter in response to movement of the spring disc, said thermostatic disc, in snapping from first to second position, applying force to the spring disc to snap the latter from its first to its second position, said spring disc then imposing a bias on said thermostatic disc tending to return it to its first position.

20. A thermostatic switch as set forth in claim 19 wherein the thermostatic disc has a central stud extending toward the spring disc, the end of the stud being spaced from the center of the spring disc when the two discs are both in the outwardly arched first position.

21. A thermostatic switch comprising a cup-shaped case, a closure for the open end of the case, a dished snap-acting spring disc peripherally supported at the open end of the case by the closure, a dished snap-acting thermostatic disc peripherally supported by the closure outward of and coaxial with the spring disc, each of said discs normally occupying an outwardly arched first position, said spring disc being adapted to snap to an inwardly arched second position upon application of force thereto in inward direction and tending to snap back to its first position upon release of the force, said thermostatic disc being adapted to snap to an inwardly arched second position upon temperature change in one direction and to snap back to its first position upon temperature change in the other direction, a pair of fixed contacts in the case located toward opposite sides of the case, a bridge member movable toward and away from the contacts on the side thereof away from the spring disc, a spring biasing said bridge member in the direction toward the fixed contacts and the spring disc, and a member interposed between the center of the spring disc and the bridge member, said thermostatic disc, in snapping from first to second position, applying force to the spring disc to snap the latter from its first to its second position, said spring disc then imposing a bias on said thermostatic disc tending to return it to its first position.

22. A thermostatic switch as set forth in claim 21 wherein the thermostatic disc has a central stud extending toward the spring disc, the end of the stud being spaced from the center of the spring disc when the two discs are both in the outwardly arched first position.

References Cited in the file of this patent

UNITED STATES PATENTS

| | | |
|---|---|---|
| 1,788,048 | Carnahan | Jan. 6, 1931 |
| 1,867,379 | Ross | July 12, 1932 |
| 2,230,770 | Van Almelo | Feb. 4, 1941 |
| 2,308,475 | Fawkes | Jan. 12, 1943 |
| 2,549,740 | Yonkers | Apr. 17, 1951 |
| 2,640,896 | Cataldo et al. | June 2, 1953 |
| 2,824,194 | Moorhead | Feb. 18, 1958 |